United States Patent
Watanabe

(10) Patent No.: US 6,363,354 B1
(45) Date of Patent: Mar. 26, 2002

(54) MAINTENANCE SYSTEM, AND RECORDING MEDIUM RECORDING THEREON A MAINTENANCE PROGRAM, FOR A PLURALITY OF PRICE LOOK-UP TABLES

(75) Inventor: Motohisa Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/386,902

(22) Filed: Aug. 31, 1999

(30) Foreign Application Priority Data

Sep. 1, 1998 (JP) ............................................. 10-247337

(51) Int. Cl.[7] ............................................. G06F 17/60
(52) U.S. Cl. ............................................. 705/20; 705/21
(58) Field of Search ............................. 705/16, 20, 21, 705/22, 28; 235/375, 383

(56) References Cited

U.S. PATENT DOCUMENTS

| | | | | |
|---|---|---|---|---|
| 4,841,442 A | * | 6/1989 | Hosoyama | 705/21 |
| 4,855,908 A | * | 8/1989 | Shimoda et al. | 705/20 |
| 4,859,838 A | * | 8/1989 | Okiharu | 705/20 |
| 4,875,163 A | * | 10/1989 | Ishii | 705/20 |
| 5,544,041 A | * | 8/1996 | Nekomoto | 705/20 |
| 5,745,705 A | * | 4/1998 | Iguchi | 705/20 |

FOREIGN PATENT DOCUMENTS

| | | | | |
|---|---|---|---|---|
| JP | 58-105375 | * | 6/1983 | 705/20 |
| JP | 58-112170 | * | 7/1983 | 705/21 |
| JP | 63-241694 | | 10/1988 | |
| JP | 3-255597 | * | 11/1991 | 705/20 |
| JP | 5-108966 | * | 4/1993 | 705/20 |
| JP | 6-337990 | | 12/1994 | |
| JP | 9-259356 | | 10/1997 | |
| JP | 10-124755 | | 5/1998 | |

OTHER PUBLICATIONS

*Automatic I.D. News* article "Bar codes: Not just for the big guy anymore" (ISSN: 0890–9768, p. 30), dated Nov. 1994.

\* cited by examiner

*Primary Examiner*—Dean J. Kramer
(74) *Attorney, Agent, or Firm*—Young & Thompson

(57) ABSTRACT

A POS server apparatus stores, in response to entry of PLU data, data consisting of a combination of revision history information on those PLU data and revised data into a master PLU history management table, at the same time multicasts that combination of data to all of POS apparatuses, and stores those PLU data into a master PLU table; and each of the plurality of POS apparatuses stores the data multicast from the POS server apparatus into a local PLU history management table and, at the same time, stores the PLU data contained in those data into a local PLU table.

5 Claims, 4 Drawing Sheets

FIG. 2

| Rev | Revised data |
|---|---|
| 1998.03.03.12.00.00.01.01.03 | Added,490100,cigarettes,¥300 |
| 1998.03.03.12.00.00.01.02.03 | Updated,490001,tangerines,¥100 |
| 1998.03.03.12.00.00.01.03.03 | Deleted,490003,egg plants,¥80 |

MAINTENANCE SYSTEM, AND RECORDING MEDIUM RECORDING THEREON A MAINTENANCE PROGRAM, FOR A PLURALITY OF PRICE LOOK-UP TABLES

BACKGROUND OF THE INVENTION

1. Field of the Invention

The present invention relates to a POS system mounted with price look-up (PLU) tables, and more particularly to a maintenance system, and a recording medium recording thereon a maintenance program, for a plurality of price look-up tables held by a plurality of POS apparatuses connected by a POS server and a LAN.

2. Description of the Related Art

A POS apparatus according to the prior art searches from PLU tables, either built into itself or provided externally, for a key value registered in advance data (including names and prices) on products, and registers their sales.

A system in which a plurality of such conventional POS apparatuses by a local area network (LAN) may be in one of the following three forms.

In a first form, each POS apparatus has PLU tables in which are stored all the PLU data; in a second form, only one POS apparatus (POS server apparatus) has PLU tables in which are stored all the PLU data while no other POS apparatus has PLU tables; and in a third form, a POS server apparatus has PLU tables in which are stored all the PLU data while other POS apparatuses have PLU tables in which are stored part of the PLU data.

Where maintenance of PLU tables (addition, updating and/or deletion of PLU data (including key values, product name and prices)) is to be accomplished in a system of the first form, a message that maintenance will be executed is successively notified from one apparatus (POS server apparatus or POS apparatus) to all other POS apparatuses (if that maintenance is addition or updating of PLU data, the PLU data to be added or updated are successively transmitted), and each of the notified POS apparatuses maintains its own PLU tables.

Maintenance of PLU tables in a system of the second form is performed on PLU tables in the POS server apparatus.

Where maintenance of PLU tables is to be accomplished in a system of the third form, first the PLU tables of the POS server apparatus are maintained, after that a message that maintenance will be executed is successively notified to all other POS apparatuses (if that maintenance is addition or updating of PLU data, the PLU data to be added or updated are successively transmitted), and each of the notified POS apparatuses maintains its own PLU tables.

A system of the first form, since one apparatus successively notifies all other POS apparatuses that maintenance will be executed, if a considerably large number (e.g. hundreds) of POS apparatuses are connected to the LAN, there will arise a substantial lag in maintenance start time between the first notified POS apparatus and the last notified POS apparatus. Thus, there may arise a problem that, depending on the timing of accessing the PLU tables, the PLU data registered in the PLU tables differ between the POS apparatus whose maintenance was first started and another POS apparatus whose maintenance was later started, or the PLU data to be accessed are not yet registered in the POS apparatus whose maintenance was later started.

In the system of the second form, though only the PLU tables in the POS server apparatus need to be maintained, since only the POS server has all the PLU data, if the POS server apparatus fails, it will become impossible to access PLU tables in all the POS apparatuses and to perform sales-related duties.

The system of the third form, like the system of the first form, involves the problem that, if the POS server apparatus fails while it is transmitting PLU data to other POS apparatuses, the contents of PLU tables may become different among different POS apparatuses.

SUMMARY AND OBJECTS OF THE INVENTION

An object of the present invention is to enable, in a system wherein a POS server apparatus and a plurality of POS apparatuses are connected by a LAN, maintenance of PLU tables held by the POS apparatuses to be executed without time lags among the apparatuses.

Another object of the invention is to enable, in a system wherein a POS server apparatus and a plurality of POS apparatuses are connected by a LAN, even if the POS server apparatus fails, maintenance of other POS apparatuses to be continued and the identity of their contents to be secured.

A first maintenance system for a plurality of price look-up tables according to the invention consists of a POS server apparatus connected to a network and a plurality of POS apparatuses, wherein the POS server apparatus stores, in response to entry of PLU data, data consisting of a combination of revision history information on the pertinent PLU data and the revised data into a master PLU history management table, at the same time multicasts the data to all of the aforementioned POS apparatuses, and stores those PLU data into a master PLU table; and each of the plurality of POS apparatuses stores the data multicast from the POS server apparatus into a local PLU history management table and, at the same time, stores the PLU data contained in the pertinent data into a local PLU table.

A second maintenance system for a plurality of price look-up tables according to the invention derives from the first maintenance system for a plurality of price look-up tables, wherein the POS server apparatus, when a plurality of sets of PLU data have been entered collectively, uses for each set of PLU data the entry date and time of the pertinent PLU data, the total number of the plurality of sets of PLU data and the serial number of that particular set of PLU data out of all those sets of PLU data as the revision history information; uses the pertinent set of PLU data and the type of processing applicable to that set of PLU data as the revised set of data; after the storing of data combining together the pertinent revision history information and the pertinent revised data into the master PLU history management table, multicasts all the sets of data stored into the master PLU history management table to all of the aforementioned POS apparatuses and, at the same time, and stores the aforementioned plurality of PLU data into the master PLU table; and each of the aforementioned plurality of POS apparatuses stores the plurality of sets of data multicast from the POS server apparatus into the local PLU history management table; at the same time, references the serial number and the total number of the sets of PLU data included in the revision history information of each of the pertinent plurality of sets of data; and, if it is confirmed that there is nothing missing in the plurality of sets of data multicast from the POS server apparatus, causes the plurality of sets of data included in the revised data of each of the pertinent plurality of sets of data to be reflected in the local PLU table according to the type of processing for the pertinent set of PLU data.

A third maintenance system for a plurality of price look-up tables according to the invention derives from the second maintenance system for a plurality of price look-up tables, wherein each of the plurality of POS apparatuses, when power supply thereto is turned on, extracts the revision history information containing the latest entry date and time out of the plurality of sets of data stored in the local PLU history management table, and transmits it to the POS server apparatus; the POS server apparatus, if revision history information containing any newer entry date and time than the entry date and time of the revision history information transmitted from the POS apparatus is stored in the master PLU history management table, multicasts to all of the POS apparatuses data combining the pertinent revision history information and the revised data corresponding to that revision history information; and each of the plurality of POS apparatuses, if the data multicast from the POS server apparatus are not stored in its local PLU history management table, stores those data into the local PLU history management table, and the PLU data included in those data are caused to he reflected in the local PLU table according to the type of processing of those PLU data.

A fourth maintenance system for a plurality of price look-up tables according to the invention derives from the third maintenance system for a plurality of price look-up tables, wherein each of the plurality of POS apparatuses, when it has revised any PLU data on itself, prepares data combining the revision history information pertaining to the processing of that revision and the revised data including those PLU data; after storing them into the local PLU history management table, multicasts those data to the POS server apparatus and other POS apparatuses and, at the same time, causes the PLU data to be reflected in the local PLU table; the POS server apparatus stores the data multicast from the POS apparatuses into the master PLU history management table and, at the same time, causes the PLU data contained in those data to be reflected in the master PLU table according to the type of processing; and each of the plurality of POS apparatuses, if the data multicast thereto from the POS server apparatus are not stored in its local PLU history management table, stores the data into the local PLU history management table, and causes the PLU data contained in those data to be reflected in the local PLU table according to the type of processing of the PLU data.

A fifth maintenance system for a plurality of price look-up tables according to the invention derives from the fourth maintenance system for a plurality of price look-up tables, wherein the POS server apparatus, when power supply thereto is turned on, requests the plurality of POS apparatuses to transmit the revision history information stored in the respective local PLU history management tables; each of the plurality of POS apparatuses, in response to the request from the POS server apparatus, transmits the revision history information stored in the local PLU history management table thereof, to the POS server apparatus; the POS server apparatus, if it finds the entry date and time of the revision history information transmitted from any of the POS apparatuses newer than the revision history information stored in its master PLU history management table, requests that POS apparatus to transmit data combining the transmitted revision history information and revised data corresponding to the revision history information; each of the POS apparatuses, in response to the request from the POS server apparatus, reads those data out of its own local PLU history management table and transmits them to the POS server apparatus; and the POS server apparatus stores the data transmitted from the POS apparatus into the master PLU history management table and, at the same time, causes the PLU data contained in those data to be reflected in the master PLU table according to the type of processing of those PLU data.

BRIEF DESCRIPTION OF THE DRAWINGS

The invention will be understood more fully from the detailed description given here below and from the accompanying drawings of a preferred embodiment of the invention, which, however, should not be regarded as limiting the invention, but are merely intended to facilitate explanation and understanding.

FIG. 2 is a diagram showing an example of the master/local PLU history management table in the embodiment of the invention.

Here, it should be noted that like reference numerals represent like elements throughout the disclosure.

DETAILED DESCRIPTION OF THE PREFERRED EMBODIMENT

A preferred embodiment of the present invention will be described in detail blow with reference to accompanying drawings.

Figure 1:
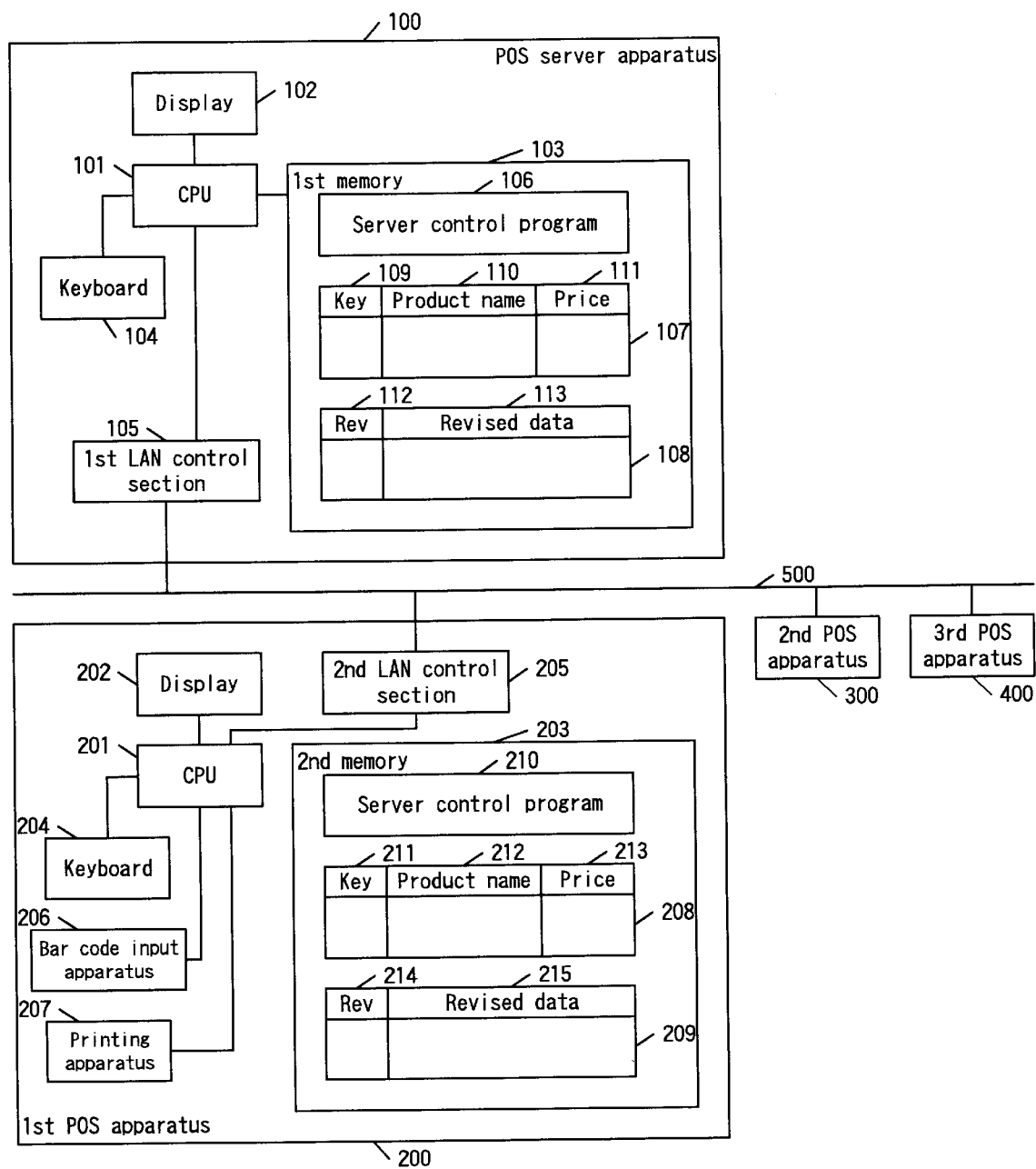
FIG. 1 is a block diagram illustrating the configuration of a preferred embodiment of the invention.
Figure 3:
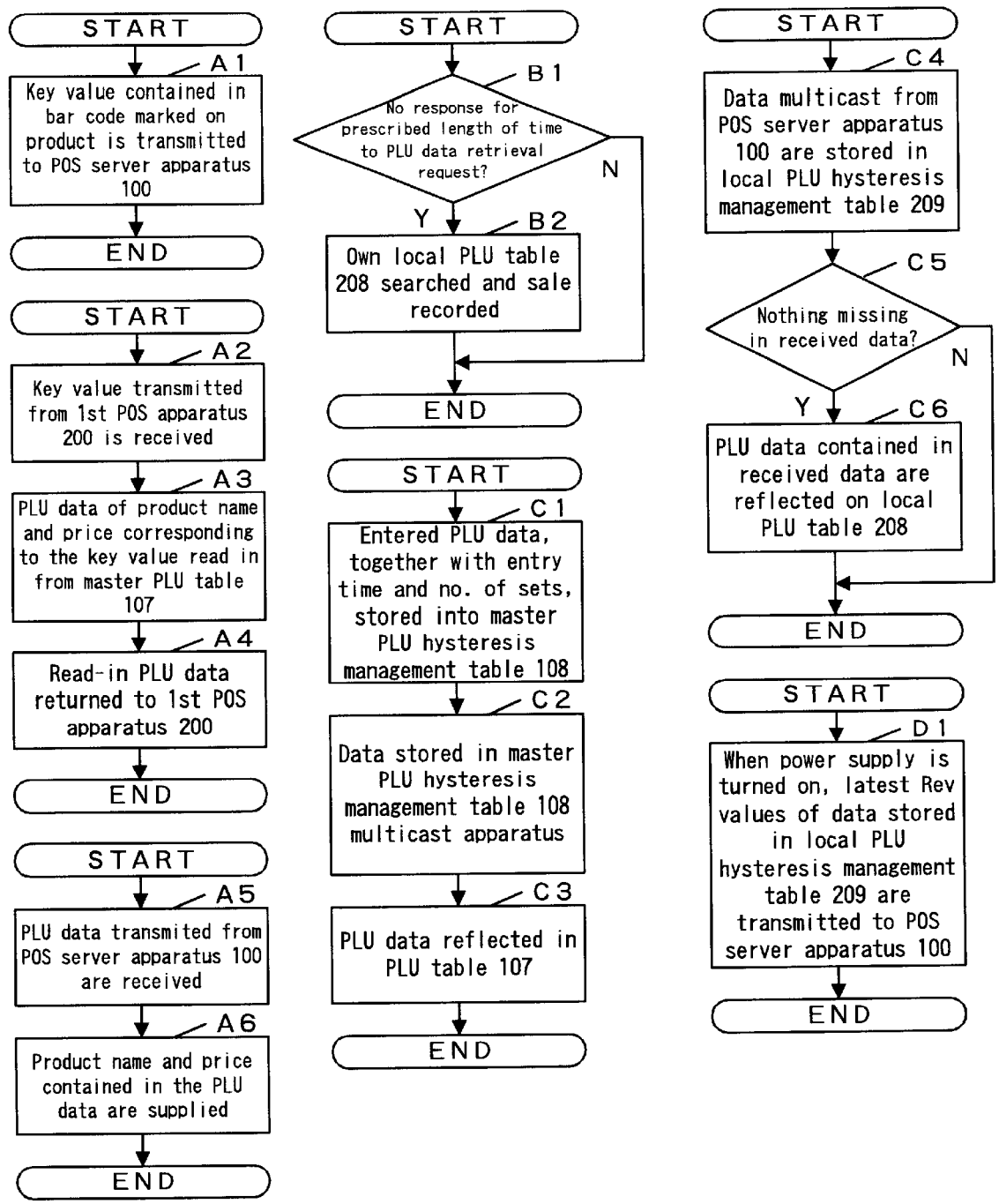
FIG. 3 is a flow chart showing a part of the operation of the embodiment of the invention.
Figure 4:
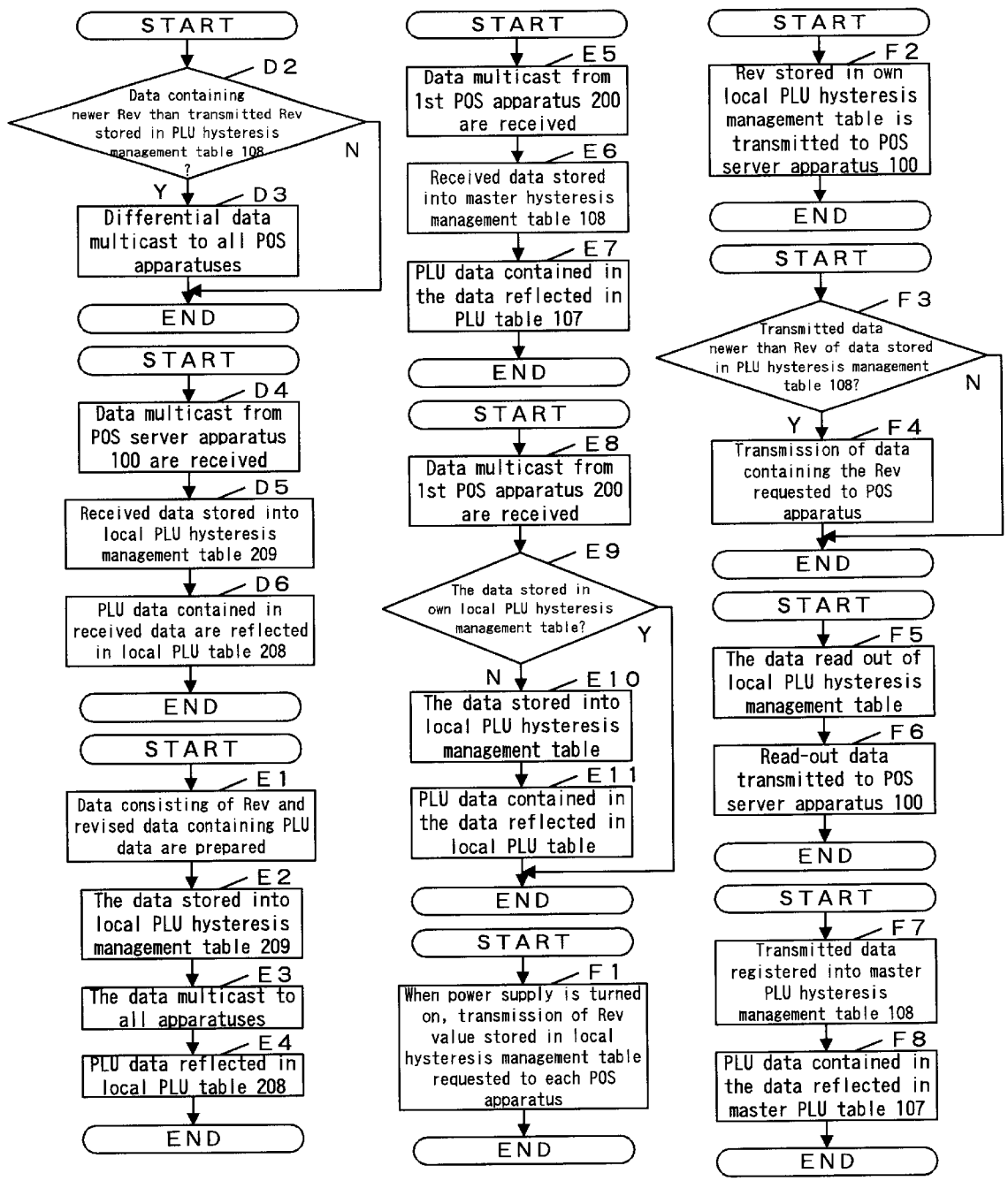
FIG. 4 is a flow chart showing another part of the operation of the embodiment of the invention.

Referring to FIG. 1, this embodiment of the invention consists of a POS server apparatus 100 operating under programmed control, a first POS apparatus 200, a second POS apparatus 300, and a third POS apparatus 400, all connected to a LAN 500.

Incidentally, although the number of POS apparatuses connected to the LAN 500 is three in this particular embodiment, obviously a greater number of POS apparatuses can be connected to implement the invention with no difference in the advantages afforded.

Possible variations of this embodiment may consist of a POS server apparatus 100, a first POS apparatus 200, a second POS apparatus 300, a third POS apparatus 400, and a recording medium 600 such as a magnetic disk apparatus or a semiconductor memory, connected by signal lines, and the POS server apparatus 100, the first POS apparatus 200, the second POS apparatus 300 and the third POS apparatus 400 perform the following steps of processing under a program loaded from the recording medium 600 via the signal lines.

The POS server apparatus 100 consists of a CPU 101, a display apparatus 102, a first memory 103, a keyboard 104, and a first LAN control section 105.

In the first memory 103 are stored a server control program 106 loaded from the recording medium 600 to control the POS server apparatus 100, a master PLU table 107, and a master PLU history management table 108.

In the entries of the master PLU table 107 are stored PLU data comprising a key 109, a product name 110, and a price 111, and the server control program 106 has a means permitting retrieval, according to the value of the key 109, of the product name 110 and the price 111 corresponding to that key.

The server control program 106 also has a means to write, read or delete PLU data stored in the master PLU table 107.

In the master PLU history management table 108 in the first memory 103 are stored a Rev 112, which is the history of the revisions of PLU data, and revised data 113 for revising PLU tables. The server control program 106 has a means to write, read or delete data stored in the master PLU history management table 108.

The first LAN control section 105 is connected to the LAN 500, and has a means for communication with a first POS apparatus 200, a second POS apparatus 300, third POS apparatus 400, all connected to the LAN 500. The first LAN control section 105 further has a multicasting means for simultaneously transmitting data to all the apparatus connected to the LAN 500 (first POS apparatus 200, second POS apparatus 300, third POS apparatus 400).

The first POS apparatus 200 consists of a CPU 201, a display apparatus 202, a second memory 203, a keyboard 204, a second LAN control section POS, a bar code input apparatus 206 and a printing apparatus 207.

In the second memory 203 are stored a POS control program 210 loaded from the recording medium 600 to control the first POS apparatus 200, a local PLU table 208 and a local PLU history management table 209.

In the local PLU table 208 are stored, as in the master PLU table 107, PLU data comprising a key 211, a product name 212, and a price 213. The POS control program 210 has a means to retrieve, according to the value of the key 211, of the product name 212 and the price 213 corresponding to that key. The POS control program 210 has a means to write, read or delete data stored in the local PLU table 208.

In the local PLU history management table 209 are stored a Rev 214, which is the history of the revisions of PLU data, and revised data 215 for revising PLU tables. The POS control program 210 has a means to write, read or delete data stored in the local PLU history management table 209.

The second LAN control section POS is connected to the LAN 500 and, like the first LAN control section of the POS server apparatus 100, has a means for communication with other apparatuses connected to the LAN 500. The second LAN control section POS further has a two-way multicasting means for simultaneously transmitting and receiving data to and from all the apparatus connected to the LAN 500.

As the second POS apparatus 300 and the third POS apparatus 400 are configured in the same way as the first POS apparatus 200, their description is dispensed with.

Next will be described in detail the operation of this embodiment of the invention with reference to accompanying drawings.

Referring to FIG. 1, in the master PLU table 107 of the POS server apparatus 100 are stored PLU for sale recording, i.e. the key, name and price of every product. In the local PLU table 208 of the first POS apparatus 200 are stored the same PLU data comprising keys, product names and prices as in the master PLU table 107. Similarly, in the local PLU tables of the second POS apparatus 300 and of the third POS apparatus 400 are stored the same PLU data comprising keys, product names and prices as in the master PLU table 107.

First will be described the actions at the time of recording a sale.

To begin with, the usual actions to record a sale at the first POS apparatus 200 will be described.

The POS control program 210 transmits the key value contained in the bar code marked on a product, read in from the input apparatus 206, to the POS server apparatus 100 via the second LAN control section POS (step A1). The server control program 106 of the POS server apparatus 100 receives the key value transmitted from the first POS apparatus 200 via the first LAN control section 105 (step A2), retrieves PLU data stored in the master PLU table 107 according to the key value, reads the PLU data of the product name and the price corresponding to the key from the master PLU table 107 (step A3), and returns the PLU data of the product name and the price as the result of retrieval to the POS apparatus 200 via the first LAN control section 105 (step A4).

The POS control program 210 of the first POS apparatus 200 receives via the second LAN control section POS the PLU data transmitted from the POS server apparatus 100 (step A5), and notifies the operator of the recording of the sale by printing out the product name and the price contained in those PLU data on the display apparatus 202 and the printing apparatus 207 (step A6).

Sale recording by the second POS apparatus 300 and that by the third POS apparatus 400 are accomplished in the same way as that by the first POS apparatus 200.

Next will be described sale recording in the first POS apparatus 200 in the event that the POS server apparatus 100 has failed.

In the event of the failure of the POS server apparatus 100 and the absence of response to a request for PLU data retrieval from the first POS apparatus 200 for a prescribed length of time (step B1), the POS control program 210 of the first POS apparatus 200 withdraws the request for PLU retrieval to the POS server apparatus 100, and searches its own local PLU table 208 to record the sale (step B2).

Similarly, both the second POS apparatus 300 and the third POS apparatus 400 respectively search their own local PLU tables to execute sale recording.

Next will be described the actions taken when any revision in PLU data occurs on the POS server apparatus side.

First will be described a usual case.

When an addition to PLU data is to be made, the operator enters the PLU data to be added from the keyboard 104 of the POS server apparatus 100.

The server control program 106 perceives the PLU data entered by the operator as the key, product name and price of an additional product, and stores them into the master PLU history management table 108 together with the time of entry and the number of PLU data inputs (step C1). The Rev 112 of the master PLU history management table 108 consists of nine items of values including the year, month, day, hours, minutes, seconds, apparatus number, serial number of revision, and total number of revisions, wherein the year has a four digit value and other items have a two digit value each. The apparatus number is uniquely set for each of the apparatuses connected to the LAN 500. The revised data 113 consist of four items of values including an addition/updating/deletion flag, key to be updated, product name and price.

Described below as examples are a case in which PLU data consisting of 490100 as key value, cigarettes as product name and ¥300 as price are added, another in which PLU data consisting of 490101 as key value, tangerines as product name and ¥100 as price are updated, and still another in which PLU data consisting of 490003 as key value, egg plants as product name and ¥80 as price are deleted, all processed on Mar. 3, 1998 at 12:00'00"

FIG. 2 shows the data stored by the server control program 106 stores into the master PLU history management table 108 when the operator has entered such PLU data and details of their revision from the keyboard 104 of the POS server apparatus 100. Into the Rev. 112 are entered 01, 02 and 03 respectively as the year, month, day and time of entry, the apparatus number (the POS server apparatus is set to be 01in this case) and the serial number tobe revised, and further is entered 03, representing the total number of entered revisions, i.e. 3. The revised data 113 included a flag indicating whether the revision is addition, updating or deletion and PLU data to be revised (key, product name and price).

The server control program 106 multicasts the data stored in the master PLU history management table 108 (the values of FIG. 2) from the first LAN control section 105 to all the POS apparatuses connected to the LAN 500 (first POS apparatus 200, second POS apparatus 300 and third POS apparatus 400) (step 02). After that, the server control program 106 causes the PLU data contained in the data stored in the master PLU history management table 108 to be reflected in the master PLU table 107 (step C3).

In the first POS apparatus 200, the data multicast from the POS server apparatus 100 are received by the second LAN control section POS, and the POS control program 210 stores them into the local PLU history management table 209 (step C4). This results in the storage of the same data into the local PLU history management table 209 as those in the master PLU history management table 108 (the values of FIG. 2). The POS control program 210, after confirming that there is nothing missing in the received data by referencing the total number of revised values for the Rev 214 and the serial number of revision (step 05), causes the PLU data contained in the PLU data contained in those data to be reflected in the local PLU table 208 (step C6).

As the data multicast from the POS server apparatus 100 are also received by the second POS apparatus 300 and the third POS apparatus 400 at the same time via the LAN 500, each POS apparatus can execute the processing to cause the PLU data to be reflected in its local PLU table at substantially the same time.

Next will be described a case in which similar data to those in the case of FIG. 2 are added, updated or deleted when the power supply to the first POS apparatus 200 is off.

In the POS server apparatus 100, similar data to those in the case of FIG. 2 are stored into the master PLU history management table 108, and the server control program 106 of the POS server apparatus 100 multicasts the data to all the ~OS apparatuses connected to the LAN 500 via the first LAN control section 105.

As the second POS apparatus 300 and the third POS apparatus 400 are in a normal state, they can receive the multicast data at the same time, and update their respective local PLU tables with the PLU data contained in those data.

However, as power supply to the first POS apparatus 200 was off, they have not received the data transmitted by the POS server apparatus 100.

Then, the POS control program 210 of the first POS apparatus 200, when the power supply is turned on, transmits to the POS server apparatus 100 the latest Rev values of the data stored in the local PLU history management table 209 (step D1), and requests confirmation of the legitimacy of the contents of the local PLU history management table 209.

The server control program 106 of the POS server apparatus 100 compares the Rev values whose confirmation has been requested by the first POS apparatus 200 with the Rev values contained in the data stored in its master PLU history management table 108 (step D2). In this example, as data containing newer values than the Rev values whose confirmation has been requested by the first POS apparatus 200 are stored in its own master PLU history management table 108, the server control program 106 of the POS server apparatus 100 multicasts the differential data from the first LAN control section 105 to all the apparatuses connected to the LAN 500 (step D3).

The POS control program 210 of the first POS apparatus 200 receives the data multicast from the POS server apparatus 100 (step D4), stores those data into the local PLU history management table 209 (step D5) and, after causing the PLU data contained in those data to be reflected in the local PLU table 208 (step D6) to match the contents of the PLU tables, starts sales recording (step D7).

The second POS apparatus 300 and the third POS apparatus 400 confirm the Rev of the multicast data and, if those data already exist in their respective local PLU history management tables, do nothing to cause the PLU data contained in those data to be reflected in the local PLU tables.

Next will described the actions which take place when PLU data are revised on the POS apparatus side.

First will be described a case in which the PLU data are revised by the first POS apparatus 200.

When the PLU data undergo revision (addition, updating or deletion) by the first POS apparatus 200, as in the case of revision by the POS server apparatus 100, the POS control program 210 prepares data consisting of the revised data 215 containing the Rev 214 and the PLU data (step E1), stores them into the local PLU history management table 209 (step E2), and multicasts those data from the second LAN control section POS to all the apparatuses connected to the LAN 500 (step E3). After that, the POS control program 210 causes the PLU data to be reflected in the local PLU table 208 (step E4).

The server control program 106 of the POS server apparatus 100, as it receives the data transmitted from the first POS apparatus 200 (step E5), perceives that the PLU data have been revised by the POS apparatus, stores the received data into the master PLU history management table 108 (step E6), and causes the PLU data contained in those data to be reflected in the master PLU table 107 (step E7).

The POS control program of each POS apparatus, as in the case of having received data from the POS server apparatus 100, when it has received the data transmitted from the first POS apparatus 200 (step E8), compares the Rev contained in the data and the Rev stored in its own local PLU history management table (step E9) and, if it judges that the data are not stored in its local PLU history management table, stores the data (step E10), then causing the PLU data contained in those data to be reflected in the local PLU table (step E11).

Next will be described a case in which the POS server apparatus 100 has failed.

As described above, when the PLU data have been revised by the first POS apparatus 200, the POS control program 210 prepares data consisting of the revised data 215 containing the Rev 214 and those PLU data, stores them into the local PLU history management table 209, and multicasts those data from the second LAN control section POS to all the apparatuses connected to the LAN 500. After that, the POS control program 210 causes the PLU data to be reflected in the local PLU table 208.

The POS control program of each POS apparatus, when it has received the data transmitted from the first POS apparatus 200, compares the Rev contained in those data and the Rev stored in its own local PLU history management table arid, if it judges that the data are not stored in its local PLU history management table, stores those data, then causing the PLU data contained in those data to be reflected in the local PLU table.

However, as the POS server apparatus 100 failed, it has not received the data transmitted by th e first POS apparatus 200.

The server control program 106 of the POS server apparatus 100, when the power supply is turned after restoration from the failure, requests each of the POS apparatuses 200 to 400 to transmit the Rev value stored in its local PLU history management table (step F1).

The POS control program of each of the POS apparatuses 200 to 400 transmits the Rev stored in its local PLU history management table to the POS server apparatus 100 (step F2).

The server control program 106 of the POS server apparatus 100, if any newer Rev than the Rev stored in its master PLU history management table 108 has been transmitted from any of the POS apparatuses 200 to 400 (step F3), request the pertinent POS apparatus to transmit data containing that Rev (step F4).

The POS control program of the POS apparatus requested to transmit the data reads those data out of the local PLU history management table (step F5), and transmits them to the POS server apparatus 100 (step F6).

The server control program 106 of the POS server apparatus 100 registers the data transmitted from the POS apparatus into the master PLU history management table 108 (step F7), and causes the PLU data contained in the data to be reflected in the master PLU table 107 (step F8).

As hitherto described, the present invention provides the advantage of making possible maintenance of PLU tables held by different POS apparatus with no time lag by arranging multicast communication means and PLU history management tables within the POS server apparatus and POS apparatuses.

It further provides the advantage of making it possible to maintain the PLU tables of the POS server apparatus and POS apparatuses and to secure the identify of their contents by arranging a means to confirm the Rev of PLU data when the power supply to each POS apparatuses is turned on.

Although the invention has been described in detail above in connection with a preferred embodiment thereof, it will be appreciated by those skilled in the art that this embodiment has been provided solely for purposes of illustration, and is in no way to be regarded as limiting the invention. Instead, various modifications and substitutions of equivalent techniques will be readily apparent to those skilled in the art upon reading this specification, and such modifications and substitutions are to be regarded as falling within the true scope and spirit of the following claims.

What is claimed is:

1. A maintenance system for a plurality of price look-up tables comprising a POS server apparatus connected to a network and a plurality of POS apparatuses, wherein:

said POS server apparatus stores, in response to entry of PLU data, data consisting of a combination of revision history information on those PLU data and revised data into a master PLU history management table, at the same time multicasts that combination of data to all of said POS apparatuses, and stores those PLU data into a master PLU table;

each of said plurality of POS apparatuses stores the data multicast from said POS server apparatus into a local PLU history management table and, at the same time, stores the PLU data contained in those data into a local PLU table;

said POS server apparatus uses, when a plurality of sets of PLU data have been entered collectively, for each set of PLU data the entry date and time of those PLU data, the total number of said plurality of sets of PLU data and the serial number of that particular set of PLU data out of all those sets of PLU data as said revision history information; uses that set of PLU data and the type of processing applicable to that set of PLU data as said revised set of data; multicasts, after the storing of data combining together the pertinent revision history information and the pertinent revised data into said master PLU history management table, all the data stored into that master PLU history management table to all of said POS apparatuses and, at the same time, stores said plurality of PLU data into the master PLU table;

each of said plurality of POS apparatuses stores the plurality of sets of data multicast from said POS server apparatus into said local PLU history management table; at the same time, references said serial number and said total number of the sets of PLU data included in the revision history information of each of the pertinent plurality of sets of data; and, if it is confirmed that there is nothing missing in the plurality of sets of data multicast from said POS server apparatus, causes the plurality of sets of data included in said revised data of each of the pertinent plurality of sets of data to be reflected in said local PLU table according to said type of processing for the pertinent PLU data;

each of said plurality of POS apparatuses, when power supply thereto is turned on, extracts said revision history information containing the latest entry date and time out of the plurality of sets of data stored in said local PLU history management table, and transmits it to said POS server apparatus;

said POS server apparatus, if revision history information containing any newer entry date and time than the entry date and time of said revision history information transmitted from said POS apparatus is stored in said master PLU history management table, multicasts to all of said POS apparatuses data combining that revision history information and the revised data corresponding to that revision history information; and each of said plurality of POS apparatuses, if the data multicast from the POS server apparatus are not stored in its local PLU history management table, stores those of data into that local PLU history management table, and the PLU data included in those data are caused to be reflected in said local PLU table according to said type of processing of those PLU data.

2. A maintenance system for a plurality of price look-up tables, as claimed in claim 1, wherein, further:

each of said plurality of POS apparatuses, when it has revised any PLU data on itself, prepares data combining said revision history information pertaining to the processing of that revision and the revised data including those PLU data; after storing them into said local PLU history management table, multicasts those data to said POS server apparatus and other POS apparatuses and, at the same time, causes those PLU data to be reflected to said local PLU table;

said POS server apparatus stores the data multicast from said POS apparatuses into said master PLU history management table and, at the same time, causes the PLU data contained in those data to be reflected in said master PLU table according to said type of processing of those PLU data; and each of said plurality of POS apparatuses, if the data multicast thereto from said POS server apparatus are not stored in said local PLU history management table thereof, stores those data into that local PLU history management table, and causes the PLU data contained in those data to be reflected in said local PLU table according to said type of processing of the PLU data.

3. A maintenance system for a plurality of price look-up tables, as claimed in claim 2, wherein, further:

said POS server apparatus, when power supply thereto is turned on, requests said plurality of POS apparatuses to transmit said revision history information stored in respective said local PLU history management tables;

each of said plurality of POS apparatuses, in response to the request from said POS server apparatus, transmits said revision history information, stored in said local PLU history management table thereof, to said POS server apparatus;

said POS server apparatus, if it finds the entry date and time of said revision history information transmitted from any of said POS apparatuses newer than the revision history information stored in its master PLU history management table, requests said POS apparatus to transmit data combining said revision history information transmitted and revised data corresponding to that revision history information;

each of said plurality of POS apparatuses, in response to the request from said POS server apparatus, reads those data out of said local PLU history management table thereof and transmits them to said POS server apparatus; and said POS server apparatus stores the data transmitted from said POS apparatus into said master PLU history management table and, at the same time, causes the PLU data contained in those data to be reflected in said master PLU table according to said type of processing of those PLU data.

4. A recording medium recording thereon a program for causing a POS server apparatus and a plurality of POS apparatuses connected to a network to cause:

said POS server apparatus to store, in response to entry of PLU data, data consisting of a combination of revision history information on those PLU data and revised data into a master PLU history management table, at the same time to multicast the data of that combination to all of said POS apparatuses, and to store those PLU data into a master PLU table;

each of said plurality of POS apparatuses to store the data multicast from said POS server apparatus into a local PLU history management table and, at the same time, to store the PLU data contained in those data into a local PLU table;

said POS server apparatus to use, when a plurality of sets of PLU data have been entered collectively, for each set of PLU data the entry date and time of that set of PLU data, the total number of said plurality of sets of PLU data and the serial number of that particular set of PLU data out of all those sets of PLU data said revision history information; to use that set of PLU data and the type of processing applicable to that set of PLU data as said revised set of data; to multicast, after the storing of data combining together the pertinent revision history information and the pertinent revised set of data into said master PLU history management table, all the sets of data stored into that master PLU history management table to all of said POS apparatuses and, at the same time, to store said plurality of sets of PLU data into the master PLU table;

each of said plurality of POS apparatuses to store the plurality of sets of data multicast from said POS server apparatus into said local PLU history management table; at the same time, to reference said serial number and said total number of the sets of PLU data included in the revision history information of each of the pertinent plurality of sets of data; and, if it is confirmed that there is nothing missing in the plurality of sets of data multicast from said POS server apparatus, to cause the plurality of sets of data included in said revised data of each of the pertinent plurality of sets of data to be reflected in said local PLU table according to said type of processing for the pertinent set of PLU data;

each of said plurality of POS apparatuses, when power supply thereto is turned on, to extract said revision history information containing the latest entry date and time out of the plurality of sets of data stored in said local PLU history management table, and to transmit it to said POS server apparatus;

said POS server apparatus, if revision history information containing any newer entry date and time than the entry date and time of said revision history information transmitted from said POS apparatus is stored in said master PLU history management table, to multicast to all of said POS apparatuses data combining that revision history information and the revised data corresponding to that revision history information;

each of said plurality of POS apparatuses, if the data multicast from the POS server apparatus are not stored in its local PLU history management table, to store those data into that local PLU history management table, and to cause the PLU data included in those data to be reflected in said local PLU table according to said type of processing for the pertinent set of PLU data;

each of said plurality of POS apparatuses, when it has revised any PLU data on itself, to prepare data combining said revision history information pertaining to the processing of that revision and the revised data including those PLU data; to multicast, after storing them into said local PLU history management table, those data to said POS server apparatus and other POS apparatuses and, at the same time, to cause those PLU data to be reflected in said local PLU table;

said POS server apparatus to store the data multicast from said POS apparatuses into said master PLU history management table, and, at the same time, to cause the PLU data contained in those data to be reflected in said master PLU table according to said type of processing of those PLU data; and each of said plurality of POS apparatuses, if the data multicast thereto from said POS server apparatus are not stored in said local PLU history management table thereof, to store those data into that local PLU history management table, and to cause the PLU data contained in those data to be reflected in said local PLU table according to said type of processing of those PLU data;

said POS server apparatus, when power supply thereto is turned on, to request said plurality of POS apparatuses to transmit said revision history information stored in respective said local PLU history management tables;

each of said plurality of POS apparatuses, in response to the request from said POS server apparatus, to transmit said revision history information, stored in said local PLU history management table thereof, to said POS server apparatus;

said POS server apparatus, if it finds the entry date and time of said revision history information transmitted from any of said POS apparatuses newer than the revision history information stored in its master PLU history management table, to request said POS apparatus to transmit data combining said revision history information transmitted and revised data corresponding to that revision history information;

each of said plurality of POS apparatuses, in response to the request from said POS server apparatus, to read those data out of said local PLU history management table thereof and to transmit them to said POS server apparatus; and said POS server apparatus to store the data transmitted from said POS apparatus into said master PLU history management table and, at the same time, to cause the PLU data contained in those data to he reflected in said master PLU table according to said type of processing of those PLU data.

5. A program embodied in electric signals for causing a POS server apparatus and a plurality of POS apparatus connected to a network to cause:

said POS server apparatus to store, in response to entry of PLU data, data consisting of a combination of revision history information on those PLU data and revised data into a master PLU history management table, at the same time to multicast the data of that combination to all of said POS apparatuses, and to store those PLU data into a master PLU table;

each of said plurality of POS apparatuses to store the data multicast from said POS server apparatus into a local PLU history management table and, at the same time, to store the PLU data contained in those data into a local PLU table;

said POS server apparatus to use, when a plurality of sets of PLU data have been entered collectively, for each set of PLU data the entry date and time of that set of PLU data, the total number of said plurality of sets of PLU data and the serial number of that particular set of PLU data out of all those sets of PLU data as said revision history information; to use that set of PLU data and the type of processing applicable to that set of PLU data as said revised set of data; to multicast, after the storing of data combining together the pertinent revision history information and the pertinent revised set of data into said master PLU history management table, all the sets of data stored into that master PLU history management table to all of said POS apparatuses and, at the same time, to store said plurality of PLU data into the master PLU table;

each of said plurality of POS apparatuses to store the plurality of sets of data multicast from said POS server apparatus into said local PLU history management table; at the same rime, to reference said serial number and said total number of the sets of PLU data included in the revision history information of each of the pertinent plurality of sets of data; and, if it is confirmed that there is nothing missing in the plurality of sets of data multicast from said POS server apparatus, to cause the plurality of sets of data included in said revised data of each of the pertinent plurality of sets of data to be reflected in said local PLU table according to said type of processing for the pertinent PLU data;

each of said plurality of POS apparatuses, when power supply thereto is turned on, to extract said revision history information containing the latest entry date and time out of the plurality of sets of data stored in said local PLU history management table, and to transmit it to said POS server apparatus;

said POS server apparatus, if revision history information containing any newer entry date and time than the entry date and time of said revision history information transmitted from said POS apparatus is stored in said master PLU history management table, to multicast to all of said POS apparatuses data combining that revision history information and the revised data corresponding to that revision history information;

each of said plurality of POS apparatuses, if the data multicast from the POS server apparatus are not stored in its local PLU history management table, to store those data into that local PLU history management table, and to cause the PLU data included in those data to be reflected in said local PLU table according to said type of processing of those PLU data;

each of said plurality of POS apparatuses, when it has revised any PLU data on itself, to prepare data combining said revision history information pertaining to the processing of that revision and the revised data including those PLU data; to multicast, after storing them into said local PLU history management table, those data to said POS server apparatus arid other POS apparatuses and, at the same time, to cause those PLU data to be reflected in said local PLU table;

said POS server apparatus to store the data multicast from said POS apparatuses into said master PLU history management table and, at the same time, to cause the PLU data contained in those data to be reflected in said master PLU table according to said type of processing of those PLU data;

each of said plurality of POS apparatuses, if the data multicast thereto from said POS server apparatus are not stored; in said local PLU history management table thereof, to store those data into that local PLU history management table, and to cause the PLU data contained in those data to be reflected in said local PLU table according to said type of processing of those PLU data;

said POS server apparatus, when power supply thereto is turned on, to request said plurality of POS apparatuses to transmit said revision history information stored in respective said local PLU history management tables;

each of said plurality of POS apparatuses, in response to the request from said POS server apparatus, to transmit said revision history information, stored in said local PLU history management table thereof, to said POS server apparatus;

said POS server apparatus, if it finds the entry date and time of said revision history information transmitted from any of said POS apparatuses newer than the revision history information stored in its master PLU history management table, to request said POS apparatus to transmit data combining said revision history information transmitted and revised data corresponding to that revision history information;

each of said POS apparatuses, in response to the request from said POS server apparatus, to read those data out of said local PLU history management table thereof and to transmit them to said POS server apparatus; and said POS server apparatus to store the data transmitted from said POS apparatus into said master PLU history management table and, at the same time, to cause the PLU data contained in those data to be reflected in said master PLU table according to said type of processing of those PLU data.

\* \* \* \* \*